United States Patent
Xin

(10) Patent No.: US 10,873,622 B2
(45) Date of Patent: Dec. 22, 2020

(54) CALL CHAIN-BASED CONCURRENCY CONTROL METHOD AND APPARATUS, AND CONTROL NODE

(71) Applicant: Huawei Technologies Co., Ltd., Shenzhen (CN)

(72) Inventor: Hua Xin, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/523,480

(22) Filed: Jul. 26, 2019

(65) Prior Publication Data
US 2019/0349423 A1    Nov. 14, 2019

Related U.S. Application Data

(63) Continuation of application No. PCT/CN2017/072781, filed on Jan. 26, 2017.

(51) Int. Cl.
*H04L 29/08* (2006.01)
*G06F 9/50* (2006.01)

(52) U.S. Cl.
CPC ........ *H04L 67/1008* (2013.01); *G06F 9/5072* (2013.01); *H04L 67/1029* (2013.01);
(Continued)

(58) Field of Classification Search
CPC ............... H06F 9/5072; H04L 67/1008; H04L 67/1029; H04L 67/1031; H04L 67/1034; H04L 67/1042; H04L 67/322
See application file for complete search history.

(56) References Cited

U.S. PATENT DOCUMENTS 9,979,674 B1 * 5/2018 Kumar .............. H04L 29/08243
10,067,799 B2 * 9/2018 Stanfill ................. G06F 9/5038
(Continued)

FOREIGN PATENT DOCUMENTS

CN    103379040 A  * 10/2013   .......... G06F 9/5083
CN    104090823 A  * 10/2014
(Continued)

OTHER PUBLICATIONS

Machine Translation and Abstract of Chinese Publication No. CN104090823, dated Oct. 8, 2014, 29 pages.
(Continued)

*Primary Examiner* — George C Neurauter, Jr.
(74) *Attorney, Agent, or Firm* — Conley Rose, P.C.

(57) ABSTRACT

A control node could obtain analysis statistical data of each of the multiple service nodes; determine a target service node with an inappropriate concurrency threshold according to the analysis statistical data of each service node; obtain a concurrency threshold of the target service node, and a concurrency threshold and weight information of a neighboring service node of the target service node; determine an updated concurrency threshold of the target service node according to the concurrency threshold of the target service node, the analysis statistical data, and the concurrency threshold and the weight information of the neighboring service node of the target service node; and send a concurrency threshold adjustment request to the target service node.

20 Claims, 6 Drawing Sheets

(52) U.S. Cl.
CPC ...... *H04L 67/1031* (2013.01); *H04L 67/1034* (2013.01); *H04L 67/1042* (2013.01); *H04L 67/322* (2013.01)

(56) References Cited

U.S. PATENT DOCUMENTS

| | | | | |
|---|---|---|---|---|
| 10,659,371 | B1* | 5/2020 | Jain | ...................... H04L 47/2425 |
| 2012/0060172 | A1 | 3/2012 | Abouzour | |
| 2014/0089932 | A1 | 3/2014 | Dube et al. | |
| 2016/0217003 | A1 | 7/2016 | Ailamaki et al. | |
| 2019/0236150 | A1* | 8/2019 | Zaslaysky | ............ G06F 9/45558 |
| 2020/0092395 | A1* | 3/2020 | Horn | ........................ G06F 9/466 |

FOREIGN PATENT DOCUMENTS

| | | | |
|---|---|---|---|
| CN | 104090823 | A | 10/2014 |
| CN | 104850431 | A | 8/2015 |
| CN | 106250199 | A | 12/2016 |

OTHER PUBLICATIONS

Machine Translation and Abstract of Chinese Publication No. CN104850431, dated Aug. 19, 2015, 14 pages.
Machine Translation and Abstract of Chinese Publication No. CN106250199, dated Dec. 21, 2016, 39 pages.
Foreign Communication From a Counterpart Application, European Application No. 17893715.7, Extended European Search Report dated Oct. 17, 2019, 11 pages.
Foreign Communication From a Counterpart Application, PCT Application No. PCT/CN2017/072781, English Translation of International Search Report dated Oct. 11, 2017, 2 pages.
Foreign Communication From a Counterpart Application, PCT Application No. PCT/CN2017/072781, English Translation of Written Opinion dated Oct. 11, 2017, 3 pages.
XP05818471, Welsh, M., et al., "SEDA: An Architecture for Well-Conditioned, Scalable Internet Services," Oct. 21, 2001, 14 pages.

* cited by examiner

CALL CHAIN-BASED CONCURRENCY CONTROL METHOD AND APPARATUS, AND CONTROL NODE

CROSS-REFERENCE TO RELATED APPLICATIONS

This application is a continuation application of Int'l Patent App. No. PCT/CN2017/072781 filed on Jan. 26, 2017, which is incorporated by reference.

TECHNICAL FIELD

The present application relates to the fields of the Internet and cloud computing, and specifically, to a call chain-based concurrency control method and apparatus, and a control node.

BACKGROUND

As the Internet and cloud computing develop, an increasing quantity of companies use a distributed architecture in which an application is divided into microservices, to better implement decoupling and coupling, so that a requirement for rapid service development is satisfied. When a service is divided more finely, for one service request, a large quantity of services may be called. A call chain technology is used for many distributed applications, to monitor a service call status. A log recording manner is used in a service call chain to store response time and parameter information about each service call, and a log of the call chain is used to monitor service performance.

For a large-scale distributed application, concurrency control can ensure application performance and reliability. In a currently common manner, to implement concurrency control, a different concurrency threshold is set for each service node. When a concurrency threshold of a service node in a call chain system cannot satisfy a service requirement of an upper-level or lower-level service node of the service node because of a faulty service node or capacity expansion, application performance and reliability cannot be ensured, affecting reliability and performance of an entire system.

SUMMARY

This application provides a call chain-based concurrency control method and apparatus, and a control node, to adjust a concurrency threshold of a service node in a concurrency control system, so that performance and reliability of the concurrency control system are ensured.

According to a first aspect, this application provides a call chain-based concurrency control method, where the method is applied to a call chain-based concurrency control system, the concurrency control system includes a control node and multiple service nodes, each service node may be configured for application service deployment, and the control node may adjust a concurrency threshold of a service node in the concurrency control system, and the process is as follows: First, the control node obtains analysis statistical data of the service nodes in the concurrency control system, and determines, according to the analysis statistical data, a target service node with an inappropriate concurrency threshold in the service nodes, where the analysis statistical data includes a delay for processing a service request by each service node, a processing result of each service node, and a call relationship with another service node. Next, the control node obtains a concurrency threshold of the target node, and a concurrency threshold and weight information of a neighboring service node of the target service node, where the concurrency threshold is used to indicate a maximum quantity of times that a service node is concurrently called in the concurrency control system, and the weight information is used to indicate a proportion relationship between concurrencies of calling the target service node by the neighboring service node. Then, the control node determines an updated concurrency threshold of the target service node according to the concurrency threshold, the analysis statistical data, and the concurrency threshold and the weight information of the neighboring service node of the target service node. Finally, the control node sends, to the target service node, a concurrency threshold adjustment request that carries the updated concurrency threshold.

During service request processing, there is a call relationship between neighboring service nodes. A process of simultaneously calling any service node by multiple neighboring upper-level service nodes or lower-level service nodes is referred to as a concurrence. A quantity of times that any service node is concurrently called by multiple service nodes simultaneously is referred to as a concurrency. A maximum quantity of times that each service node can be simultaneously called by multiple upper-level service nodes or lower-level service nodes is referred to as a concurrency threshold of the service node.

A distributed service call relationship is used in the call chain-based concurrency control system, service request processing needs to be performed sequentially on service nodes according to a preset sequence. For any service node, during service request processing, a service node that needs to complete service request processing before the any service node is referred to as an upper-level service node of the any service node, and a service node that needs to complete service request processing after the any service node is referred to as a lower-level service node of the any service node. An upper-level service node and a lower-level service node are service nodes relative to a designated service node, and an upper-level service node and a lower-level service node of the designated service node vary with the designated service node when the designated service node is different. An upper-level service node includes a service node that needs to complete service request processing before the any service node and that has a direct call relationship with the any service node, and includes a service node that needs to complete service request processing before the any service node and that has an indirect call relationship with the any service node. A lower-level service node includes a service node that needs to complete service request processing after the any service node and that has a direct call relationship with the any service node, and includes a service node that needs to complete service request processing after the any service node and that has an indirect call relationship with the any service node. For ease of description, an upper-level service node and a lower-level service node may be collectively referred to as neighboring service nodes.

It should be noted that, the weight information may be designated by a user, or may be set to a system default value. In addition, the weight information is used to indicate a proportion relationship between concurrency thresholds of at least two upper-level or lower-level service nodes of a same service node. When there is only one upper-level service node or only one lower-level service node of a service node, weight information of the upper-level service node or the lower-level service node is 1. Assuming that a service node B has only one lower-level service node, that is, a lower-level service node D, a weight of the service node D is 1. When a concurrency threshold of the service node D is equal to that of the service node B, the service node D can call all resources of the service node B to process a service request.

Optionally, the analysis statistical data may further include an identifier and quantity information of a service request processed by each service node.

It should be noted that, the control node may periodically obtain analysis statistical data, a concurrency threshold, and weight information according to a service requirement, or collect the foregoing information in real time, so as to better adjust and control the concurrency thresholds of the service nodes in the call chain-based concurrency control system.

In the foregoing possible technical solution provided in this application, the control node may monitor a service node status and a service call status in the concurrency control system, and adjust the concurrency threshold of the target service node in the concurrency control system, so that the updated concurrency threshold of the target service node can satisfy a concurrency capability call relationship. This resolves a problem that processing performance of the call chain-based concurrency control system deteriorates because of an inappropriate concurrency threshold, thereby ensuring stability and reliability of the call chain-based concurrency control system, reducing a service request processing delay, and improving service request processing performance.

In a possible implementation of the first aspect, the target service node is a service node corresponding to a processing result, in the analysis statistical data, that service request processing fails. When determining, according to the processing result in the analysis statistical data, that there is a service node corresponding to a processing result that indicates a failure, the control node determines that the service node is the target service node with an inappropriate concurrency threshold. For service nodes with appropriate concurrency thresholds, the service nodes can normally process service requests. Therefore, once it is detected that a service node fails in service request processing, it indicates that the service node may be faulty, and further it is determined that the service node is the target service node with an inappropriate concurrency threshold. In this way, the service node with an inappropriate concurrency threshold is determined accurately.

Further, a result of processing a service request by a service node may indicate a failure in any one of the following cases:

Case 1: An excessively small concurrency threshold is set for the target service node, and the target service node cannot satisfy a call relationship with an upper-level service node or a lower-level service node.

Case 2: Some hardware of the target service node is faulty, and a processing capability of the target service node decreases. For example, some CPUs of the target service node are faulty.

Case 3: There is a network fault on a network of the target service node, for example, a network intermittent disconnection.

In another possible implementation of the first aspect, the control node may determine the target service node with an inappropriate concurrency threshold according to a service request in the analysis statistical data, or may determine the target service node with an inappropriate concurrency threshold by detecting interruption statuses of multiple service requests that pass through a same service node. For a single service request, a network intermittent disconnection may cause a service request interruption, and the service request may continue to be processed after recovery from the network intermittent disconnection. Therefore, an analysis result obtained by analyzing interruption statuses of multiple service requests is more accurate.

In another possible implementation of the first aspect, when determining, according to the analysis statistical data, that a service request processing delay of a service node is greater than or equal to a preset threshold, the control node may determine that the service node is the target service node with an inappropriate concurrency threshold. For service nodes with appropriate concurrency thresholds, service request delays of the service nodes should be less than the preset threshold. Therefore, once it is detected that a service request processing delay of a service request processed by a service node is greater than or equal to the preset threshold, it indicates that the service node may be faulty (for example, a network fault due to a fault of a network interface card of the service node), and further it is determined that the service node is the target service node with an inappropriate concurrency threshold. In this way, the service node with an inappropriate concurrency threshold is determined accurately.

In another possible implementation of the first aspect, the control node may determine the target service node with an inappropriate concurrency threshold by detecting delays of multiple service requests that pass through a same service node. For a single service request, a service request processing delay may be greater than or equal to the preset threshold because of a network intermittent disconnection or another fault that can be automatically rectified (such as an abnormality of a service process). Therefore, an analysis result obtained by analyzing delays of multiple service requests is more accurate. The foregoing different manners may be used to determine a target service node with an inappropriate concurrency, and therefore the target service node with an inappropriate concurrency may be determined flexibly.

In another possible implementation of the first aspect, the method for determining, by the control node, an updated concurrency threshold of the target service node may include the following operations: obtaining, by the control node, a service call topology relationship in the concurrency control system; and determining the updated concurrency threshold of the target service node according to the concurrency threshold of the target service node, the service call topology relationship, and concurrency thresholds and weight information of upper-level service nodes or lower-level service nodes. The updated concurrency threshold satisfies a preset call relationship in the topology relationship. Therefore, stability and reliability of a call chain system is ensured, a service request processing delay is reduced, and performance of the call chain system is improved.

It should be noted that, for a same concurrency control system, a service call topology relationship is relatively fixed, and the control node may save the service call topology relationship after obtaining the service call topology relationship for the first time. During a subsequent concurrency threshold adjustment process, the control node adjusts and controls a concurrency threshold of a service node in the call chain-based concurrency control system by using the service call topology relationship as a reference. In this way, resource waste is avoided because the service call topology relationship does not need to be obtained in all adjustments.

In another possible implementation of the first aspect, the call chain-based concurrency control system further includes an information processing node. The information processing node is configured to: obtain the analysis statistical data of the multiple service nodes; and analyze the service call topology relationship in the concurrency control system by using the call relationship between each service node and another service node in the analysis statistical data. In this case, the analysis statistical data obtained by the control node from the information processing node further includes the service call topology relationship. Alternatively, the control node may analyze, based on the call relationship between each service node and another service node in the analysis statistical data, the service call topology relationship in the concurrency control system.

Further, the control node may determine, based on the service call topology relationship, the target service node with an inappropriate concurrency threshold. Instead of directly analyzing the target service node with an inappropriate concurrency threshold according to the analysis statistical data, the control node may learn the service call relationship in the entire concurrency control system according to the service call topology relationship, so as to determine the target service node with an inappropriate concurrency threshold more quickly.

In another possible implementation of the first aspect, after determining the updated concurrency threshold of the target service node, the control node may determine a neighboring service node of the target service node as a new target service node, and adjust a concurrency threshold of the new target service node in a same manner. The process is repeated, to finally complete adjustment of concurrency thresholds of all the service nodes in the entire concurrency control system.

In another possible implementation of the first aspect, after determining the updated concurrency threshold of the target service node, the control node adjusts the neighboring service node of the target service node according to the service call topology relationship, the updated concurrency threshold of the target service node, and the concurrency threshold and the weight information of the neighboring service node of the target service node, so as to obtain an updated concurrency threshold of the neighboring service node. Then, the control node sends the updated concurrency threshold of the neighboring service node to the neighboring service node. In this way, the concurrency threshold of the neighboring service node of the target service node is adjusted.

Still further, the foregoing manner is repeatedly used to adjust concurrency thresholds of upper-level service nodes and lower-level service nodes adjacent to the target service node, to finally adjust concurrency thresholds of service nodes in the entire concurrency control system.

According to a second aspect, this application provides a call chain-based concurrency control apparatus. The apparatus incorporates modules implementing the call chain-based concurrency control method in any one of the first aspect or possible implementations of the first aspect. The modules may be implemented by hardware, or may be implemented by corresponding software executed by hardware. The hardware or software includes one or more modules corresponding to the foregoing functions.

According to a third aspect, this application provides a control node, where the control node includes a processor, a memory, a communications interface, and a bus; the processor, the memory, and the communications interface are connected and communicate with each other by using the bus; the memory is configured to store a computer executable instruction; and when the control node runs, the processor executes the computer executable instruction in the memory, to perform operation steps of the call chain-based concurrency control method in any one of the first aspect or possible implementations of the first aspect by using a hardware resource of the control node.

According to a fourth aspect, this application provides a computer-readable storage medium, where the computer-readable storage medium stores an instruction, which enables a computer to execute the method in the foregoing aspects when the instruction runs on the computer.

In comparison with other approaches, in the technical solutions in embodiments of the present application, the control node may obtain the analysis statistical data, the concurrency threshold, and the weight information of the service nodes to monitor a service call relationship in the call chain-based concurrency control system, and adjust the concurrency threshold of each service node in the one or more service nodes, so that the updated concurrency thresholds can satisfy a concurrency capability call relationship. This resolves a problem that processing performance of the concurrency control system deteriorates because of an inappropriate concurrency threshold in the call chain-based concurrency control system, thereby ensuring stability and reliability of the call chain-based concurrency control system, reducing a service request processing delay, and improving overall service request processing performance.

Based on the implementations provided in the foregoing aspects, this application may further provide more implementations by performing further combinations.

BRIEF DESCRIPTION OF DRAWINGS

To describe technical solutions in embodiments of the present application, the following details the technical solutions in the present application with reference to the accompanying drawings.

DESCRIPTION OF EMBODIMENTS

To make persons skilled in the art understand the technical solutions in the present application better, the following clearly describes the technical solutions in the embodiments of the present application with reference to the accompanying drawings in the embodiments of the present application.

Figure 1:
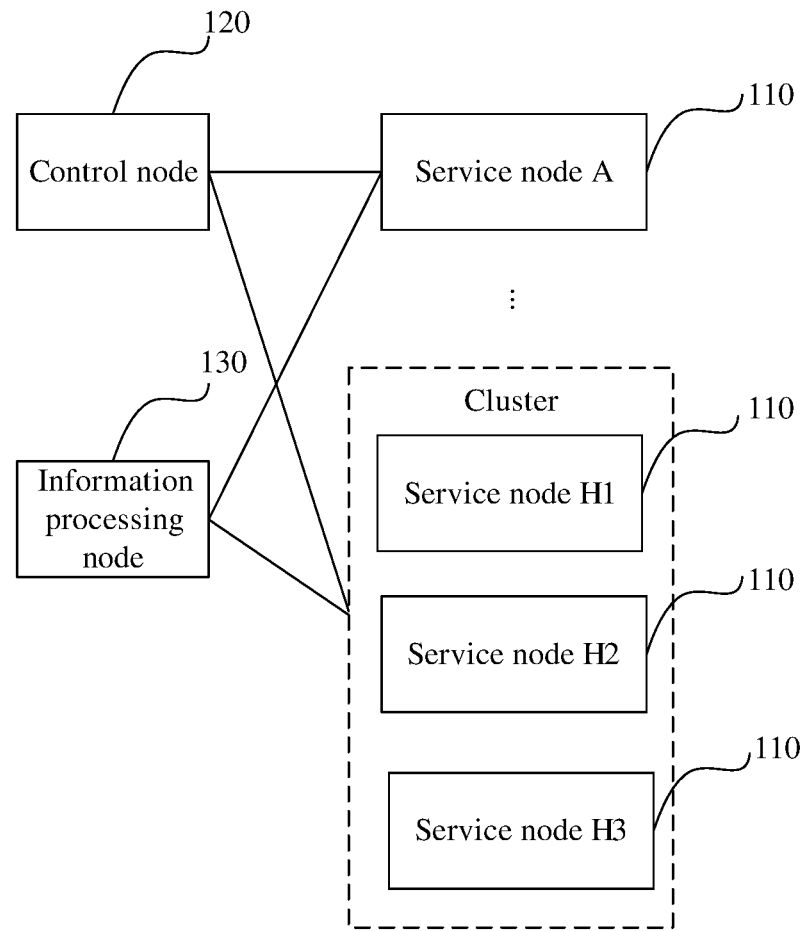
FIG. 1 is a schematic architecture diagram of a call chain-based concurrency control system according to an embodiment of the present application.

FIG. 1 is a schematic architecture diagram of a call chain-based concurrency control system 100 according to an embodiment of the present application. As shown in FIG. 1, the concurrency control system includes at least one service node 110, a control node 120, and an information processing node 130.

The service node 110 is configured for application service deployment. Each application service may be deployed on a single service node 110, or may be deployed on a cluster including the multiple service nodes 110. The application service is a service for running a same service application. For example, a Taobao shopping application includes three application services: a Web service, an order service, and a payment service. When shopping on Taobao, a user needs to select a needed commodity by using the Web service, add the needed commodity with an attached postal address to an order by using the order service, and finish purchasing the needed commodity by using the payment service. In an application service deployed on a cluster, a same service application is deployed on each service node, and a load balancing policy is used between different service nodes, so that reliability and processing efficiency of an application service are ensured.

For example, as shown in FIG. 1, an application service A needs to be deployed on a single service node A; an application service H is a high-load application service, and needs to be deployed on a cluster including multiple service nodes, that is, a service node H1, a service node H2, and a service node H3 are jointly configured for deployment of the application service H. A load balancing policy is used between the service node H1, the service node H2, and the service node H3, which are jointly responsible for processing the application service H, so that reliability and processing efficiency of the application service H are ensured.

Optionally, the application service may alternatively be deployed in a distributed form. The application service for processing a service request is divided into different sub-services, and the sub-services are respectively deployed on different service nodes, and a high-load sub-service in the application service may alternatively be deployed on a cluster including multiple service nodes, so that a call relationship between different application services is better decoupled and coupled. For example, an application service may be divided into a service A, a service B, and a service C. The sub-services may be deployed on one or more service nodes 110. Each sub-service may be deployed on one service node, may be deployed on a cluster including multiple service nodes, or may be deployed on both a single service node and a cluster. During service request processing, there is a call relationship between neighboring service nodes. A process in which any service node can be simultaneously called by multiple neighboring upper-level service nodes or lower-level service nodes is referred to as a concurrence. A quantity of times that any service node is concurrently called by multiple service nodes is referred to as a concurrency. A maximum quantity of times that each service node can be simultaneously called by multiple upper-level service nodes or lower-level service nodes is referred to as a concurrency threshold of the service node. For example, a call relationship of an application service is a service A->a service B. It is assumed that the service A is deployed on a cluster including three service nodes, and the service B is deployed on a single service node. In this case, a process in which the three service nodes with the service A deployed may simultaneously call the service node with the service B deployed, to complete service request processing is referred to as a concurrence; a quantity of times that each service node corresponding to the service A simultaneously calls the service node with the service B deployed, at a current moment is referred to as a concurrency of the service node with the service B deployed; and a maximum quantity of times that the three service nodes with the service A deployed can simultaneously call the service node with the service B deployed, at the current moment is referred to as a concurrency threshold of the service nodes with the service A deployed. The concurrency threshold of the service A is a sum of concurrency thresholds of the service nodes with the service A deployed.

Figure 2:
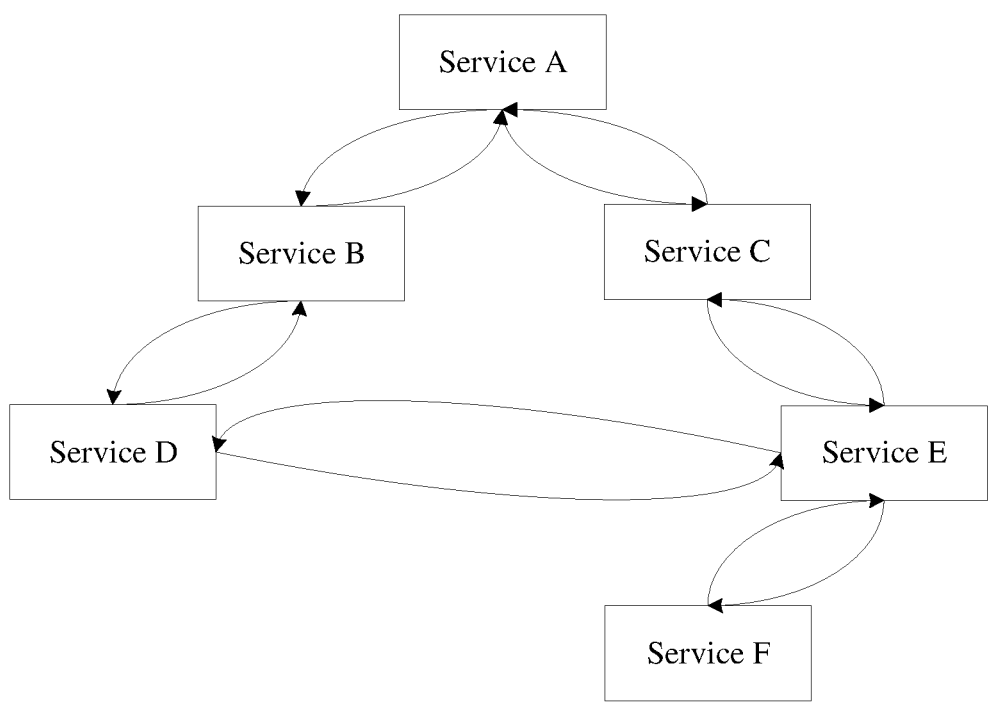
FIG. 2 is a schematic diagram of a distributed service call relationship in a call chain-based concurrency control system according to an embodiment of the present application.

A call chain is formed between service nodes according to a processing process of an application service. One concurrency control system 100 may include at least one call chain, and each call chain is used to identify a track of an application service processing process of one service application. For example, FIG. 2 is a schematic diagram of a distributed service call relationship in a call chain-based concurrency control system according to an embodiment of the present application. As shown in FIG. 2, the concurrency control system includes two call chains. A service request 1 needs to sequentially pass through a service A, a service B, a service D, a service E, and a service F during a processing process, and in this case, a call chain corresponding to the service request 1 is the service A->the service B->the service D->the service E->the service F. A service request 2 needs to sequentially pass through the service A, a service C, the service E, and the service F during a processing process, and in this case, a call chain corresponding to the service request 2 is the service A->the service C->the service E->the service F. When service requests of a user are received, different service requests pass through different call chains to complete a processing process of an application service.

It should be noted that, on a same service node, only one application service or only one sub-service of one application service is deployed, or multiple application services, multiple sub-services of one application service, or multiple sub-services of multiple application services can be deployed. This is not limited in the present application. For ease of description, in the following description of the present application, an example in which only one sub-service of one application service is deployed on each service node is used for specific description.

The control node 120 is configured to dynamically adjust a concurrency threshold of a service node in the call chain-based concurrency control system 100. Specifically, the control node 120 may be deployed alone on a physical server or a virtual machine, or may be deployed in a joint deployment manner, that is, the control node and a service node on which another application service is deployed are jointly deployed on a same physical server for implementation.

The information processing node 130 is configured to: collect a log of each service node 110, and generate analysis statistical data according to recorded log content. The analysis statistical data includes a delay for processing a service request by each service node 110, a processing result of each service node 110, and a call relationship with another service node, for example, a success or a failure, that is, whether each service request is interrupted on each service node 110. Specifically, the information processing node 130 may be deployed alone on a physical server or a virtual machine.

Specifically, based on the distributed call chain relationship shown in FIG. 2, a service node may record, in a log, information such as response time and an input parameter about each service request call. A uniform log tracing point model is used for logs. Recorded log content may be customized for each service request, for example, TraceId|CalledNodeId| . . . |Span. TraceId is used to uniquely identify each service request, and TraceId is generated by a start service node of an application service and is transferred along a call chain. The start node of the application service is also referred to a root node. CalledNodeId is used to identify a service node that is passed through during service request processing, that is, CalledNodeId may identify a call relationship between a current service node and another service node during service request processing, so that a topology relationship is determined by sequentially analyzing all service nodes that are passed through during TraceId processing. For example, a root node of a service request whose TraceId is 1 is a service node A; the service node A calls a service node B, the service node B calls a service node D, the service node D calls a service node E, and the service node E calls a service node F. In this case, a call chain corresponding to a service request can be obtained. If a root node corresponding to another TraceId recorded in the log of the service node is also the service node A, the service node A calls a service node C, the service node C calls a service node E, and the service node E calls a service node F. In this case, a call chain corresponding to another service request can be obtained, and a service call topology relationship between service nodes can be finally obtained by integrating different call chains. Span is used to identify a delay for passing through each service node by a service request, so that a delay for processing each service request by each service node can be obtained.

Optionally, when a sub-service is deployed on a cluster, a log of each service node with the sub-service deployed, may further record information about a deployment form of the sub-service. For example, the service E is deployed on a service node E1, a service node E2, and a service node E3, and logs of the service node E1, the service node E2, and the service node E3 all record that the service is deployed on a cluster and record an identifier of another service node in a same cluster. An identifier of a service node may be a name or an IP address of the service node.

Optionally, the log of the service node may further record another service call parameter according to a service requirement, for example, record a result of processing each service request by each service node. For example, a Result identifier may be added to record whether each TraceId is successfully called by each service node, so that a result of processing each service request by each service node can be obtained. For example, Result0 indicates that a service request TraceId is successfully called, and Result1 indicates that a service request TraceId is unsuccessfully called. A TraceId is generated during user entry calling, and is sequentially transferred to a service node with the service A deployed, a service node with the service B deployed, a service node with the service C deployed, a service node with the service D deployed, a service node with the service E deployed, and a service node with the service F deployed. A TraceId needs to be transferred during processing of each service request. The information processing node collects and processes logs recorded by the service nodes, obtains complete call chain information of a service request according to the TraceId, and can easily analyze a performance status during service request processing according to the call chain information. Table 1 lists an example of analysis statistical data of a distributed service call relationship in a call chain-based concurrency control system. Span AB is used to indicate a time used for transferring a service request from the service node A to the service node B, that is, indicate a delay of the service node A. By analogy, meanings of Span AC, Span BD, Span CE, Span DE, and Span EF can be obtained. Assuming that a TraceId is 1, the TraceId indicates a service request that passes through a call chain: the service node A->the service node B->the service node D->the service node E->the service node F. Assuming that a TraceId is 2, the TraceId indicates a service request passes through a call chain: the service node A->the service node C->the service node E->the service node F. The information processing node may determine, according to another TraceId, each service node called by a service request corresponding to the TraceId.

Still further, after obtaining the logs that are recorded by each service node during service request processing, the information processing node may determine, according to the TraceId, all service nodes that a same service request passes through during processing. According to the data listed in Table 1, the information processing node may determine a quantity of service requests, a service request delay, and a processing result that are of each service node, and a call relationship with another service node according to service nodes that a TraceId passes through and data (for example, a SpanId) corresponding to the TraceId, and may further analyze a call relationship between each service node and another service node, to determine the service call topology relationship in the concurrency control system.

TABLE 1

| TraceId | Span AB | Span AC | Span BD | Span CE | Span DE | Span EF | ... |
|---------|---------|---------|---------|---------|---------|---------|-----|
| 1 | <Data 1> | None | <Data 2> | None | <Data 3> | <Data 4> | ... |
| 2 | None | <Data 5> | None | <Data 6> | None | <Data 7> | ... |
| ... | ... | ... | ... | ... | ... | ... | ... |

Optionally, the information processing node may collect a log of a service node periodically or in real time.

Optionally, the analysis statistical data may further include an identifier and quantity information of a service request processed by each service node.

Optionally, the control node 120 and the information processing node 130 in FIG. 1 may be jointly deployed on a physical server or a virtual machine. The physical server or the virtual machine is configured to not only adjust a concurrency threshold of a service node in the concurrency control system, but also collect a delay for processing a service request by each service node, a processing result of each service node, and a call relationship with another service node.

Figure 3:
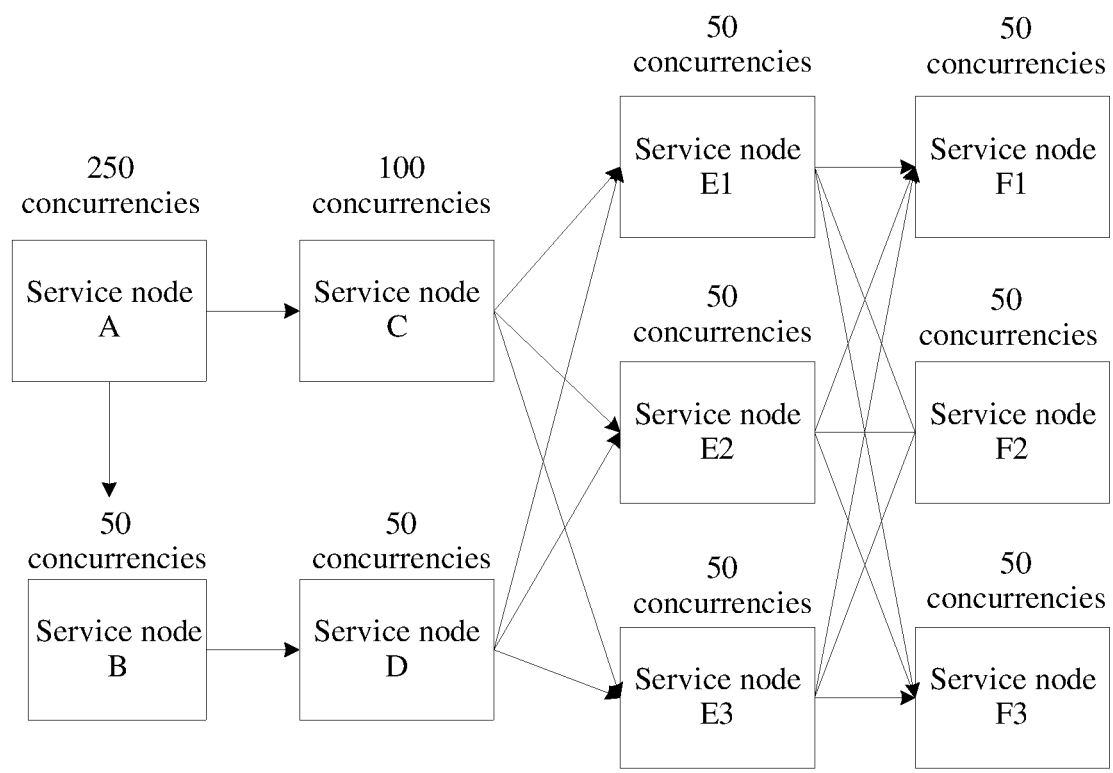
FIG. 3 is a schematic diagram illustrating that service nodes in a call chain-based concurrency control system control concurrency thresholds by themselves according to some approaches.

There are generally two control methods for managing and controlling concurrency thresholds of the service nodes in the call chain-based concurrency control system shown in FIG. 2. One method is: At a call start location of a service request, a uniform concurrency threshold is set for service nodes 110 with sub-services of one application service deployed. For example, all the concurrency thresholds of the service nodes 110 are set to 100 by using a uniform interface or web interface. A disadvantage of this method is that an upper-level service cannot sense statuses of numerous lower-level services. The upper-level service is a start sub-service during application service processing, for example, the service A. The lower-level service is a sub-service that has an indirect call relationship with the upper-level service during the application service processing, for example, the service D, the service E, and the service F are lower-level services of the service A. To prevent deterioration of overall system performance caused by a fault of a lower-level sub-service, a relatively large quantity of resources are reserved, and consequently, resources are wasted. The other method is: Different concurrency thresholds are set for service nodes 110 with sub-services of one application service deployed. For example, a maximum concurrency that can be supported by a service node is set as a concurrency threshold of the service node. FIG. 3 is a schematic diagram illustrating that service nodes in a call chain-based concurrency control system corresponding to a call chain system shown in FIG. 2 control concurrency thresholds by themselves. As shown in FIG. 3, the service A is provided by the service node A, the service B is provided by the service node B, the service C is provided by the service node C, and the service D is provided by the service node D. The service E and the service F are deployed on clusters. The service E is deployed on a service node E1, a service node E2, and a service node E3, and the service F is deployed on a service node F1, a service node F2, and a service node F3. A load balancing policy is used for service nodes in a cluster to complete a processing process of each call chain. The service nodes set different concurrency thresholds according to maximum concurrencies that can be supported by the service nodes. For example, the service node E1, service node E2, and service node E3 that provide the service E each support a maximum concurrency 50, and therefore, a maximum concurrency processing capability of the cluster that provides the service E is 150; the service node F1, service node F2, and service node F3 that provide the service F each support a maximum concurrency 50, and therefore, a maximum concurrency processing capability of the cluster that provides the service F is 150. As upper-level service nodes of the service E, the service node C and the service node D are respectively corresponding to concurrency thresholds 100 and 50.

A distributed service call relationship is used in the call chain-based concurrency control system, service request processing needs to be performed sequentially on service nodes according to a preset sequence. For any service node, during service request processing, a service node that needs to complete service request processing before the any service node is referred to as an upper-level service node of the any service node, and a service node that needs to complete service request processing after the any service node is referred to as a lower-level service node of the any service node. An upper-level service node and a lower-level service node are service nodes relative to a designated service node, and the upper-level service node and the lower-level service node of the designated service node vary with the designated service node. An upper-level service node includes a service node that needs to complete service request processing before the any service node and that has a direct call relationship with the any service node, and includes a service node that needs to complete service request processing before the any service node and that has an indirect call relationship with the any service node. A lower-level service node includes a service node that needs to complete service request processing after the any service node and that has a direct call relationship with the any service node, and includes a service node that needs to complete service request processing after the any service node and that has an indirect call relationship with the any service node. For ease of description, an upper-level service node and a lower-level service node may be collectively referred to as neighboring service nodes. For example, in a call relationship, that is, the service node A->the service node B->the service node C->the service node D, for the service node C, the service node A and the service node B are upper-level service nodes of the service node C, the service node B is an upper-level service node that completes service processing before the service node C and that has a direct call relationship with the service node C, the service node A is an upper-level service node that completes service processing before the service node C and that has an indirect call relationship with the service node C, and the service node D is a lower-level service node of the service node C. For the service node B, the service node A is an upper-level service node of the service node B, the service node C and the service node D are lower-level service nodes of the service node B, the service node C is a lower-level service node that completes service processing after the service node B and that has a direct call relationship with the service node B, and the service node D is a lower-level service node that completes service processing after the service node B and that has an indirect call relationship with the service node B.

However, when the foregoing method is used to control the concurrency thresholds of the service nodes in the concurrency control system shown in FIG. 3, and when a service node that provides the service E is faulty, for example, when the service node E1 is faulty, the maximum concurrency capability of the cluster that provides the service E is changed from 150 to 100. In this case, if a sum of concurrencies that the service C and the service D in the call chain system concurrently call the service E is greater than 100, a service request call performed by the service nodes A and B may fail. However, the fault of service E can be sensed only when the service C or the service D is called during service processing, and service request processing is not completed. Consequently, an upper-level service node of the service node E1 works in vain, and resources are wasted. In addition, as the sum of the concurrency capabilities of the service nodes that provide the service E decreases, a service capability of the lower-level node of the service node decreases. However, the downstream link service F of the service E still provides reserved resources for the three service nodes, and consequently, resources are wasted.

It should be noted that, when a quantity of service requests satisfies the concurrency capability of the service E, a call can still be normally performed. Alternatively, concurrency control can be performed well on some services in the call chain system, but an effect of overall concurrency control cannot be ensured. For example, in FIG. 3, in the call chain, that is, the service A->the service C->the service E->the service F, if the maximum concurrency threshold supported by the service E is 150, the concurrency threshold is feasible for a single service node. However, a maximum concurrency threshold supported by the service node A is 250, lower-level service nodes of the service node A include the service node B and the service node C, and a sum of concurrency thresholds of the service node B and the service node C is 150. In this case, the concurrency threshold of the service node A is greater than the sum of the concurrency thresholds of the service node B and the service node C. Therefore, to support the concurrency threshold 250, the service node A reserves corresponding resources. However, during actual service request processing, the reserved resources are redundant, and resources are wasted.

To resolve the foregoing problem, an embodiment of the present application provides a call chain-based concurrency control method. After the control node 120 obtains the analysis statistical data of the multiple service nodes and determines a target service node with an inappropriate concurrency threshold, the control node 120 dynamically adjusts the concurrency threshold of the target service node, so that reliability of a call chain system including the service nodes can be ensured in real time.

The following describes the embodiments of the present application in detail with reference to the accompanying drawings, to facilitate understanding of persons skilled in the art.

Figure 4:
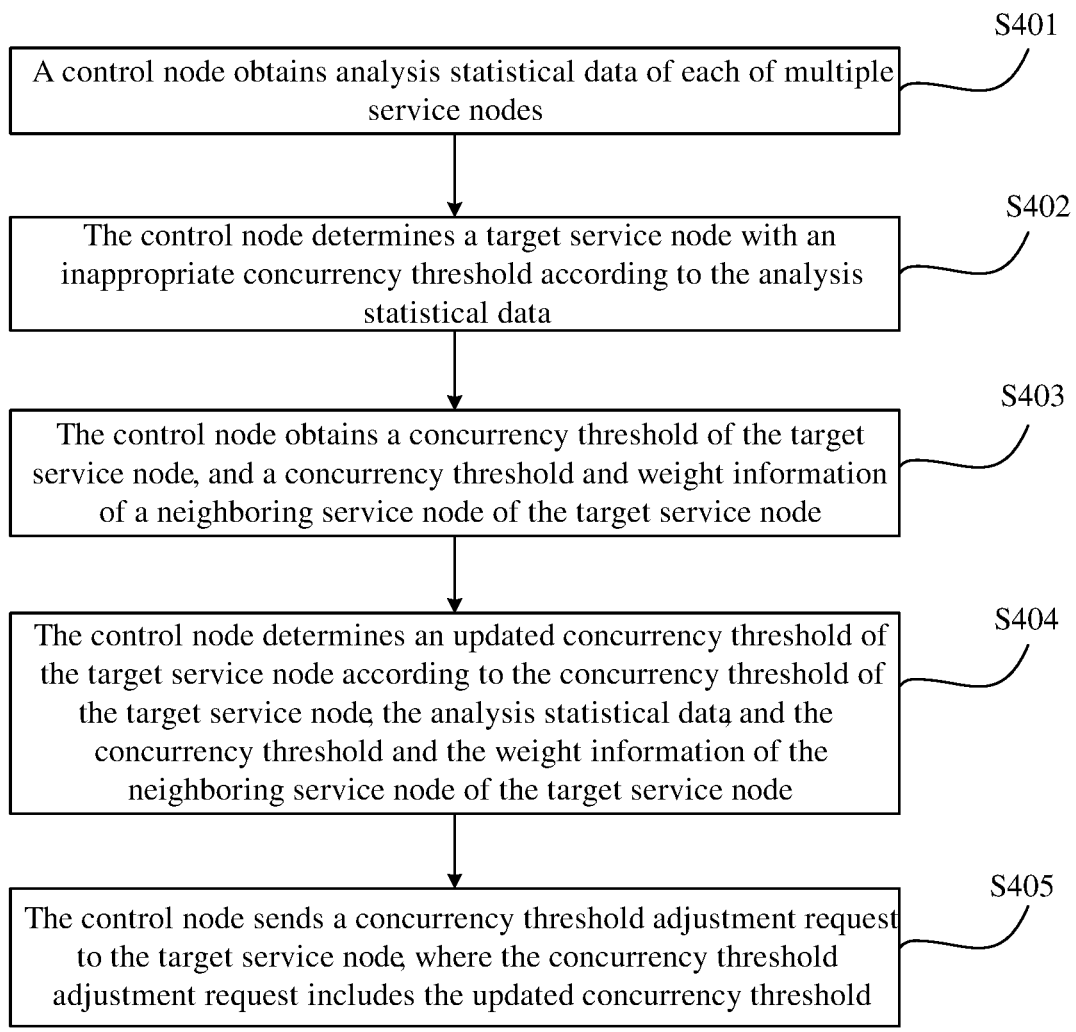
FIG. 4 is a schematic flowchart of a call chain-based concurrency control method according to an embodiment of the present application.

FIG. 4 is a schematic flowchart of a call chain-based concurrency control method according to an embodiment of the present application. The method is applied to the call chain-based concurrency control system shown in FIG. 1. As shown in FIG. 4, the method may include the following steps.

S401. A control node obtains analysis statistical data of each of multiple service nodes.

The analysis statistical data includes a delay for processing a service request by each service node in the call chain-based concurrency control system, a processing result of each service node, and a call relationship with another service node. The processing result is used to indicate a success/failure status, for example, a success or a failure. When the processing result indicates a failure, it indicates that a service request is interrupted during a processing process performed by a service node. The analysis statistical data is obtained by analyzing logs, collected by an information processing node, of service nodes by the information processing node in the call chain system 100 shown in FIG. 1.

Further, a manner of obtaining analysis statistical data by the control node may be: The control node sends, to the information processing node, a request message for obtaining analysis statistical data, and the information processing node sends the analysis statistical data to the control node according to the request message. The control node may obtain analysis statistical data periodically or in real time. This is not limited in the present application.

The analysis statistical data obtained by the control node from the information processing node may be the analysis statistical data that includes the delay for processing a service request by each service node, the processing result of each service node, and the call relationship with another service node. Optionally, the information processing node may further analyze the analysis statistical data, to obtain a service call topology relationship between the service nodes. In this case, the analysis statistical data may further include the service call topology relationship. Therefore, the control node can analyze a service call status in the call chain system more intuitively according to the analysis statistical data.

For example, the information processing node further analyzes the analysis statistical data, traces, according to TraceIds, service nodes that call chains pass through, and combines all the call chains to form a call relationship between the service nodes, that is, a service call topology relationship of an application service. If the analysis statistical data obtained by the control node is analysis statistical data that does not undergo further processing, the control node may further obtain a service call topology relationship in this manner. Therefore, the processing manner is more flexible.

S402. The control node determines a target service node with an inappropriate concurrency threshold according to the analysis statistical data.

Specifically, the control node analyzes the analysis statistical data obtained in S401 to obtain the target service node with an inappropriate concurrency threshold. The control node determines the target service node with an inappropriate concurrency threshold in one of the following manners.

Manner 1: When it is detected that a service request fails on a service node, it may be determined that a concurrency threshold of the service node is inappropriate.

Specifically, the control node may determine the service node with an inappropriate concurrency threshold according to the processing result in the analysis statistical data. When a processing result in analysis statistical data of any service node indicates a failure, it is determined that the service node is the target service node with an inappropriate concurrency threshold. A result of processing a service request by a service node may indicate a failure in any one of the following cases:

Case 1: An excessively small concurrency threshold is set for the target service node, and the target service node cannot satisfy a call relationship with an upper-level service node or a lower-level service node.

Case 2: Some hardware of the target service node is faulty, and a processing capability of the target service node decreases. For example, some CPUs of the target service node are faulty.

Case 3: There is a network fault on a network of the target service node, for example, a network intermittent disconnection.

Optionally, the control node may detect whether a service request fails on a service node to determine whether the service node is the target service node with an inappropriate concurrency threshold.

Optionally, the control node may detect success/failure statuses of multiple service requests that pass through a same service node to determine the target service node with an inappropriate concurrency threshold. It can be understood that, for a single service request, a network intermittent disconnection may cause a service request failure, and the service request may continue to be processed after recovery from the network intermittent disconnection. Therefore, an analysis result obtained by analyzing success/failure statuses of multiple service requests is more accurate.

For example, in a possible embodiment of the present application for the call chain system shown in FIG. 2, it is assumed that each service is deployed on one service node. The control node first obtains analysis statistical data of each service node, and may determine a processing process of a service request according to the analysis statistical data of each service node. When it is learnt that there is no analysis statistical data about a lower-level service node of a service node or a processing result in analysis statistical data of a lower-level service node of a service node indicates a failure, for example, information obtained by the control node does not include analysis statistical data of a service node E, it may be determined that the service node E is faulty. That is, it is determined that the service node E is a target service node with an inappropriate concurrency threshold.

For example, in another possible embodiment of the present application, for the call chain-based concurrency control system shown in FIG. 2, success/failure statuses of multiple service requests may also be analyzed to determine the target service node with an inappropriate concurrency threshold. It is assumed that each service is deployed on one service node. It can be learnt from FIG. 2 that, the concurrency control system includes two call chains, and each call chain may process one service request. If the service node E is faulty, the control node may determine, according to analysis statistical data, that a service request that passes through a service node A->a service node B->a service node C->the service node E fails on the service node E, and determine, according to the analysis statistical data, that a service request that passes through the service node A->the service node B->a service node D->the service node E fails on the service node E. In this case, that the service node E is a target service node with an inappropriate concurrency threshold can be determined more accurately. A method for determining a service node on which a service fails during processing of each service request is the same as that in the foregoing embodiment. Details are not described herein again.

It should be noted that, for a sub-service deployed on a single service node, when the entire service node is faulty (for example, the entire service node is faulty because of power off), a call chain cannot continue to complete a service request processing process. Based on the analysis statistical data obtained by the control node, only a call relationship can be determined according to an upper-level service node of the faulty service node, but analysis statistical data of the faulty service node cannot be obtained. In this case, because the analysis statistical data of the service node cannot be obtained, the control node may also determine that the faulty service node is the target service node. A maintenance engineer needs to further determine a fault cause and rectify a fault.

Manner 2: When it is detected that a delay for processing a service request by a service node exceeds a preset threshold, it may be determined that a concurrency threshold of the service node is inappropriate.

Specifically, the control node may determine the service node with an inappropriate concurrency threshold according to whether a delay for processing a service request by each service node in the analysis statistical data exceeds the preset threshold. The preset threshold may be a service request delay threshold that is set on an empirical basis and that can identify an service node with an inappropriate concurrency threshold, or may be a service request delay threshold that is determined according to a service request delay of each service node in the analysis statistical data and that can identify an service node with an inappropriate concurrency threshold.

It can be understood that, for a service node with an appropriate concurrency threshold, a service request delay of the service node is less than the preset threshold. Therefore, once it is detected that a service request delay of a service request processed by a service node is greater than or equal to the preset threshold, it indicates that the service node may be faulty (such as a network fault), and further it is determined that the service node is the target service node with an inappropriate concurrency threshold.

Manner 3: When it is detected that delays for processing a service request by multiple service nodes exceed a preset threshold, it may be determined that concurrency thresholds of the multiple service nodes are inappropriate.

Specifically, the control node may alternatively determine the target service node with an inappropriate concurrency threshold according to the multiple service nodes, in one call chain, corresponding to delays that exceed the preset threshold.

Optionally, the control node may determine the target service node with an inappropriate concurrency threshold by detecting delays of multiple service requests. It can be understood that, for a single service request, a service request processing delay may be greater than or equal to the preset threshold because of a network intermittent disconnection or another fault that can be automatically rectified (such as an abnormality of a service process). Therefore, an analysis result obtained by analyzing delays of multiple service requests is more accurate.

For example, in a possible embodiment of the present application, for the call chain system shown in FIG. 2, it is assumed that each service is deployed on one service node, and the preset threshold is 0.05 s. If a service request needs to pass through the service node A, the service node B, and the service node E during a processing process, a service request delay of the service node A and the service node B that is detected according to the analysis statistical data is 0.01 s, and a service request delay of the service node E is 0.1 s, the service request delay of the service node E is greater than the preset threshold. In this case, it may be determined that the service node E is a target service node with an inappropriate concurrency threshold.

Optionally, in a possible embodiment of the present application, for the target service node with the appropriate concurrency threshold, an initial concurrency threshold may be set inappropriately. For example, an initially specified concurrency threshold is excessively large or excessively small.

Optionally, in another possible embodiment of the present application, for the target service node with the appropriate concurrency threshold, an initial concurrency threshold may alternatively be set appropriately. However, during a running process of the concurrency control system, after the control node adjusts a faulty service node, a concurrency threshold of an upper-level or lower-level service node of the faulty service node becomes inappropriate.

It should be noted that, the control node uses all the foregoing three manners to monitor whether the concurrency control system includes a target service node with an inappropriate concurrency threshold. When an initial concurrency threshold of a service node is set inappropriately, a service node is faulty, or after the control node adjusts a concurrency threshold of a service node, a concurrency threshold of an upper-level service node or a lower-level service node of the service node becomes inappropriate, the control node determines the target service node with an inappropriate concurrency threshold in time, and adjusts the target service node with an inappropriate concurrency threshold. This ensures performance of the concurrency control system.

S403. The control node obtains a concurrency threshold of the target service node, and a concurrency threshold and weight information of a neighboring service node of the target service node.

The concurrency threshold is a maximum quantity of times that the service node is concurrently called in the call chain-based concurrency control system. The weight information is used to indicate a proportion relationship between concurrencies of calling the target service node by the neighboring service node. The neighboring service nodes of the target service nodes include an upper-level service node and a lower-level service node of the target service node. Therefore, the weight information may be used to indicate a proportion relationship between concurrency thresholds of lower-level service nodes that simultaneously call a same service node in a call chain, or a proportion relationship between concurrency thresholds of upper-level service nodes that simultaneously call the service node. Referring to FIG. 3, there are two lower-level service nodes of a service node A, that is, a service node B and a service node C. Assuming that a ratio between concurrency thresholds of the service node B and the service node C is 2:3, and a concurrency threshold of the service node A is 100, it may be determined that the concurrency thresholds of the service node B and the service node C are 40 and 60, respectively. In this case, a call relationship between the service node A and the service node B and between the service node A and the service node C satisfies an optimal configuration during service request processing. Therefore, resources between the service nodes can be fully utilized, and the concurrency threshold of the service node A can satisfy maximum processing capabilities of the service node B and the service node C during service processing. Alternatively, the weight information is used to indicate a proportion relationship between concurrency thresholds of multiple upper-level service nodes that simultaneously call a service node. After a concurrency threshold of the service node is determined, a concurrency threshold of an upper-level service node and a concurrency threshold of a lower-level service node may be determined according to the weight information. A process for determining a concurrency threshold is the same as the foregoing process for determining the concurrency thresholds of the service node A, the service node B, and the service node C. Details are not described herein again.

It should be noted that, the weight information may be designated by a user, or may be set to a system default value. In addition, the weight information is used to indicate a proportion relationship between concurrency thresholds of at least two service nodes of a same service node. When there is only one upper-level service node or only one lower-level service node of a service node, weight information of the upper-level service node or the lower-level service node is 1. As shown in FIG. 2, assuming that a service node B has only one lower-level service node, that is, a lower-level service node D, a weight of the service node D is 1. When a concurrency threshold of the service node D is equal to that of the service node B, the service node D can call all resources of the service node B to process a service request.

Optionally, the control node may obtain, from service nodes, a concurrency threshold and weight information of each service node in real time, or may obtain a concurrency threshold and weight information of each service node periodically, so that the control node can monitor and adjust a service call status of the service node according to the latest concurrency threshold and the latest weight information that are obtained by the control node.

Specifically, the service nodes may directly send the concurrency thresholds and the weight information to the control node. For example, client agent modules are installed on the service nodes. The client agent modules send the concurrency thresholds and the weight information of the service nodes to the control node.

S404. The control node determines an updated concurrency threshold of the target service node according to the concurrency threshold of the target service node, the analysis statistical data, and the concurrency threshold and the weight information of the neighboring service node of the target service node.

Specifically, after determining the target service node with an inappropriate concurrency threshold, the control node first analyzes the call relationship between each service node and another service node to obtain a service call topology relationship between the service nodes in the concurrency control system. Then, the control node determines the updated concurrency threshold of the target service node according to the concurrency threshold of the target service node, the service call topology relationship, and the concurrency threshold and the weight information of the neighboring service node of the target service node in S403. The updated concurrency threshold makes the service call topology relationship satisfies a call requirement of an upper-level service node and/or a lower-level service node of each service node when each service node in the call chain is called, and avoids a resource waste problem that is caused by redundant resources reserved by a service node.

Optionally, the analysis statistical data obtained by the control node may further include the service call topology relationship.

Specifically, the service call topology relationship may be determined by the information processing node according to the logs of the service nodes, and is sent to the control node. Alternatively, the service call topology relationship may be determined by the control node directly according to the obtained call relationship between each service node and another service node in the analysis statistical data. Therefore, the processing manner is more flexible.

For a same concurrency control system, a service call topology relationship is relatively fixed, and the control node may save the service call topology relationship after obtaining the service call topology relationship for the first time. During a subsequent concurrency threshold adjustment process, the control node adjusts and controls a concurrency threshold of a service node in the call chain-based concurrency control system by using the service call topology relationship as a reference. In this way, resource waste is avoided because the service call topology relationship does not need to be obtained in all adjustments.

Still further, after the target service node is adjusted, if there is still another target service node with an inappropriate concurrency threshold in the concurrency control system, either of the following two manners may be used to adjust the concurrency threshold of the another service node in the concurrency control system.

Manner 1: Step S402 may continue to be performed to determine an upper-level service node and/or a lower-level service node of the target service node as new target service nodes/a new target service node, and a same manner is used to adjust a concurrency threshold of the new target service node determined. The process is repeated, to complete adjustment of concurrency thresholds of all the service nodes in the entire concurrency control system.

For example, in a possible embodiment of the present application, an excessively small concurrency threshold is currently set for the target service node. For example, an initially specified concurrency threshold of the target service node is excessively small, and therefore, the concurrency threshold is inappropriate. Referring to FIG. 2, it is assumed that each service is deployed on one service node, the concurrency threshold of the service node A, the concurrency threshold of the service node B, and the concurrency threshold of the service node C are all set to 50, a proportion relationship between the concurrency thresholds of the service node B and the service node C is 1:1, and a sum of the concurrency thresholds of the service node B and the service node C is greater than the concurrency threshold of the service node A. Therefore, after obtaining the analysis statistical data of each service node, the control node may determine that the service node A is a target service node with an inappropriate concurrency threshold. If a maximum concurrency threshold that can be supported by the service node A is greater than or equal to 100, the control node directly adjusts the concurrency threshold of the service node A to 100. If a maximum concurrency threshold that can be supported by the service node A is 50, the control node separately adjusts the concurrency thresholds of the service node B and the service node C to 25. In this way, one adjustment of the concurrency threshold of the target service node is completed. If the concurrency threshold of the service node A is 100, the concurrency threshold of the service node B is 50, the concurrency threshold of the service node C is 50, and the concurrency threshold of the service node D is 100, step S402 may continue to be performed to determine that the service node D is a target service node with an inappropriate concurrency threshold. In this case, the concurrency threshold of the service node D is also adjusted to 50 according to the concurrency threshold 50 of the upper-level service node B of the service node D, so that the service node D and the service node B can satisfy a call requirement in the distributed service call relationship shown in FIG. 2. If there is another target service node with an inappropriate concurrency threshold in the concurrency control system, the same manner may continue to be used to adjust the concurrency thresholds of the another service node, until all the service nodes satisfy a call requirement of another service node in the distributed service call relationship and there is no resource waste problem that is caused by redundant resources reserved by a service node.

For example, in another possible embodiment of the present application, an excessively large concurrency threshold is set for the target service node. For example, an initially specified concurrency threshold of the target service node is excessively large, and therefore, the concurrency threshold is inappropriate. It is assumed that in FIG. 2, the concurrency threshold of the service node A is 200, and the concurrency thresholds of both the service node B and the service node C are 50. In this case, a proportion relationship between the concurrency thresholds of the service node B and the service node C is 1:1, and a sum of the concurrency thresholds of the service node B and the service node C is 100, that is, the service node B and the service node C can process a maximum of 100 service call relationships simultaneously delivered by the service node A. After obtaining the analysis statistical data of each service node, the control node may determine that the specified concurrency threshold of the service node A is excessively large. In this case, the control node adjusts the concurrency threshold of the service node A to 100 according to the concurrency threshold of the service node A, the concurrency thresholds and the weight information of the lower-level service nodes of the service node A. Likewise, the same manner may continue to be used to adjust a concurrency threshold of another service node in the concurrency control system.

It should be noted that, when a service is deployed on a cluster including multiple service nodes and one of the service nodes is faulty, a sum of concurrency thresholds of the multiple service nodes that provide the service changes, and consequently, does not match a concurrency threshold of an upper-level service node and/or a concurrency threshold of a lower-level service node of the service, affecting overall performance of the call chain system. The target service node is first determined in S402, and then a maximum quantity of service requests that can be concurrently run on the target service node is obtained according to the analysis statistical data to determine that the maximum quantity of service requests is the updated concurrency threshold of the target service node.

For example, in still another possible embodiment of the present application, referring to FIG. 3, a service E and a service F are deployed on clusters, and both the service node C and the service node D call multiple service nodes with the service E deployed, for service processing. At a current moment, if the concurrency threshold of the service node C is 100, and the concurrency threshold of the service node D is 50, a proportion relationship between the concurrency thresholds of the service node C and the service node D is 2:1. In this case, a sum of concurrency thresholds of a service cluster with the service E deployed should be 150, and concurrency thresholds of a service node E1, a service node E2, and a service node E3 are all 50. Therefore, the cluster with the service E deployed can simultaneously process processing requests that come from the service node C and the service node D whose sum of the concurrency thresholds is 150. When one service node with the service E deployed is faulty, the sum of the concurrency thresholds of the cluster with the service E deployed changes to 100. If the service node C and the service node D execute the service call relationship for a service request still according to the concurrency thresholds that are originally configured, processing of some service requests fails. In this case, the control node may determine, according to the analysis statistical data, that the faulty service node is a target service node with an inappropriate concurrency threshold, and directly determine, according to the analysis statistical data, that the maximum quantity of service requests that can be concurrently run on the target service node is 100. Therefore, the sum of the updated concurrency thresholds of the service nodes with the service E deployed may be adjusted to 100. After the concurrency thresholds of the service nodes with the service E deployed are adjusted, the concurrency thresholds of the upper-level service node and the lower-level service node of the service node with the service E deployed does not match the concurrency threshold of the service node with the service E deployed. Therefore, step S402 may continue to be performed to determine that the upper-level service node and/or the lower-level service node of the service node with the service E deployed are/is target service nodes with inappropriate concurrency thresholds/a target service node with an inappropriate concurrency threshold. For example, the service node C is determined as a target service node with an inappropriate concurrency threshold, and the updated concurrency threshold of the service node C may be adjusted to 50 according to the concurrency threshold and the weight data of the lower-level service node E of the service node C, so that the service node E can satisfy a call requirement of the upper-level service node of the service node E. The foregoing step may be repeated to sequentially adjust concurrency thresholds of other service nodes in the concurrency control system, until all the service nodes satisfy a call requirement of another service node in the distributed service call relationship and there is no resource waste problem that is caused by redundant resources reserved by a service node.

Manner 2: After the target service node is adjusted, an upper-level service node and/or a lower-level service node of the target service node are/is adjusted, to complete adjustment of concurrency thresholds of all the service nodes in the concurrency control system. A specific adjustment manner is as follows.

The control node may execute one adjustment task to adjust the concurrency thresholds of the service nodes in the concurrency control system. After determining one target service node, the control node sequentially adjusts a concurrency threshold of an upper-level service node of the target service node and/or a concurrency threshold of a lower-level service node of the target service node, and sends the updated concurrency threshold to a service node that needs to be adjusted. Alternatively, only one target service node is determined for each adjustment task. After a concurrency threshold of the target service node is adjusted, the same method is used to adjust a concurrency threshold of an upper-level service node or a lower-level service node of the target service node.

For the upper-level service node of the target service node, after the control node determines the updated concurrency threshold of the target service node, the control node adjusts the upper-level service node of the target service node according to the service call topology relationship, the updated concurrency threshold of the target service node, and a concurrency threshold and weight information of a neighboring service node of the target service node, to obtain an updated concurrency threshold of the upper-level service node.

It should be noted that, an adjustment principle of adjusting the concurrency threshold of the upper-level service node of the target service node and/or the concurrency threshold of the lower-level service node of the target service node by using the foregoing manner is the same as that of adjusting the concurrency threshold of the target service node. Therefore, after the concurrency threshold of the target service node is adjusted and the concurrency threshold of the upper-level service node of the target service node and/or the concurrency threshold of the lower-level service node of the target service node are/is sequentially adjusted, all the service nodes in the concurrency control system satisfy a call requirement of another service node in the distributed service call relationship and there is no resource waste problem that is caused by redundant resources reserved by a service node.

For example, in a possible embodiment of the present application, referring to FIG. 2, it is assumed that each service is deployed on one service node, the concurrency threshold of the service node A is set to 200, the concurrency threshold of the service node B is set to 100, the concurrency threshold of the service node C is set to 50, the concurrency threshold of the service node E is set to 50, a proportion relationship between the concurrency thresholds of the service node B and the service node C is 1:1, and the service node can support a maximum concurrency threshold of 120. In this case, the service node C cannot satisfy a call requirement of the service node A, and therefore, it may be first determined that the service node C is a target service node with an inappropriate concurrency threshold. The control node determines, according to the concurrency threshold of the service node C, and the concurrency threshold and the weight information of the upper-level service node A, that the updated concurrency threshold of the service node C is 100, and adjusts the concurrency threshold of the service node E according to the service call topology relationship shown in FIG. 2, the updated concurrency threshold 100 of the service node C, and the concurrency threshold and the weight information of the lower-level service node E of the service node C, to obtain an updated concurrency threshold 100 of the service node E, so as to satisfy a service call relationship with the service node C.

After determining the target service node with an inappropriate concurrency threshold, the control node uses the manner 2 to sequentially adjust the upper-level service node and the lower-level service node of the target service node. A to-be-adjusted service node may be a service node described in either of the following cases.

Case 1: An upper-level service node and a lower-level service node of a target service node with an inappropriate concurrency threshold need to be adjusted.

For example, as shown in FIG. 2, if the service node C is a target service node with an inappropriate concurrency threshold, when the control node adjusts the concurrency threshold of the service node C, a service request processing capability of the lower-level service node is affected. That is, the concurrency threshold of the service node E also needs to be adjusted.

An upper-level service node and a lower-level service node of a target service node with an inappropriate concurrency threshold include an upper-level service node and a lower-level service node that are adjacent to the target service node and that have call relationships with the target service node with an inappropriate concurrency threshold, and an upper-level service node and a lower-level service node that are not adjacent to the target service node and that have call relationships with the target service node with an inappropriate concurrency threshold.

For example, as shown in FIG. 2, it is assumed that each service is deployed on one service node. If the service node E is a target service node with an inappropriate concurrency threshold, after the control node determines that the concurrency thresholds of the service node C and the service node F need to be adjusted, updated concurrency thresholds of the service node C and the service node F make the current concurrency threshold of the service node A inappropriate. In this case, the control node further needs to adjust the concurrency threshold of the service node A.

Case 2: An upper-level service node or a lower-level service node of a target service node with an inappropriate concurrency threshold needs to be adjusted.

After determining the target service node, the control node determines, according to the concurrency threshold of the target service node, and the concurrency threshold and the weight information of the upper-level service node or the lower-level service node of the target service node, that the concurrency threshold of the target service node does not need to be adjusted. For example, if a maximum quantity of concurrencies that can be supported by the target service node is less than the concurrency threshold of the upper-level service node or the lower-level service node of the target service node, the concurrency threshold of the upper-level service node or the lower-level service node of the target service node needs to be adjusted, to ensure performance of the entire concurrency control system.

Optionally, during a concurrency threshold adjustment process, the control node may alternatively disable a service node to adjust the concurrency threshold of the call chain system, so as to reduce a resource loss.

For example, as shown in FIG. 3, during a process of adjusting a concurrency threshold by the control node, if the concurrency threshold of the service node with the service E deployed needs to be adjusted from 150 to 100, because the service E is jointly provided by the service node E1, the service node E2, and the service node E3, and a quantity of concurrencies of the service nodes are all 50, one service node may be disabled in this case. For example, the service node E1 may be disabled, so that a resource loss of the service node E1 is reduced.

S405. The control node sends a concurrency threshold adjustment request to the target service node, where the concurrency threshold adjustment request includes the updated concurrency threshold.

Optionally, in a possible embodiment of the present application, after the control node determines the upper-level service node or the lower-level service node of the target service node as a new target service node, the control node sends the concurrency threshold adjustment request to the new target service node after determining an updated concurrency threshold of the new target service node. The concurrency threshold adjustment request includes the updated concurrency threshold of the new target service node. This step is repeated, to update the concurrency thresholds of all the service nodes in the concurrency control system.

Optionally, in another possible embodiment of the present application, after adjusting the concurrency threshold of the target service node, the control node sequentially adjusts the concurrency threshold of the upper-level service node and/or the concurrency threshold of the lower-level service node of the target service node, to obtain an updated concurrency threshold of the upper-level service node and/or an updated concurrency threshold of the lower-level service node of the target service node. Then, the control node sends the concurrency threshold adjustment request to the upper-level service node and/or the lower-level service node of the target node, where the concurrency threshold adjustment request includes the updated concurrency threshold corresponding to the upper-level service node and/or the updated concurrency threshold corresponding to the lower-level service node, so that each service node can adjust its concurrency threshold, and the concurrency thresholds of all the service nodes in the concurrency control system are finally updated. It can be understood that, the updated concurrency thresholds are sent to the target service nodes, so that the target service nodes may adjust the concurrency thresholds according to the updated concurrency thresholds, and therefore the concurrency thresholds of the service nodes satisfy a call relationship.

According to the foregoing content description, the control node obtains the analysis statistical data of each service node; determines the target service node according to the analysis statistical data; obtains the concurrency threshold and the weight information of the upper-level service node or the lower-level service node of the target service node; determines the updated concurrency threshold of the target service node according to the concurrency threshold of the target service node, the analysis statistical data, and the concurrency threshold and the weight information of the upper-level service node or the lower-level service node; and sends, to the target service node, the concurrency threshold adjustment request carrying the updated concurrency threshold. The control node may determine a target node with an inappropriate concurrency threshold periodically or in real time according to the analysis statistical data, and adjust the concurrency threshold of the target service node. Therefore, the control node can dynamically adjust a concurrency threshold of a service node, so that the updated concurrency threshold can satisfy a concurrency capability call relationship. This resolves a problem that processing performance of the concurrency control system deteriorates because the call chain-based concurrency control system cannot sense a service node fault in time or a concurrency threshold is inappropriate, thereby ensuring stability and reliability of the concurrency control system, reducing a service request processing delay, and improving overall service request processing performance.

The following describes, by using a specific example, a procedure for adjusting a concurrency threshold of each service node by the control node. Details are as follows.

Figure 5:
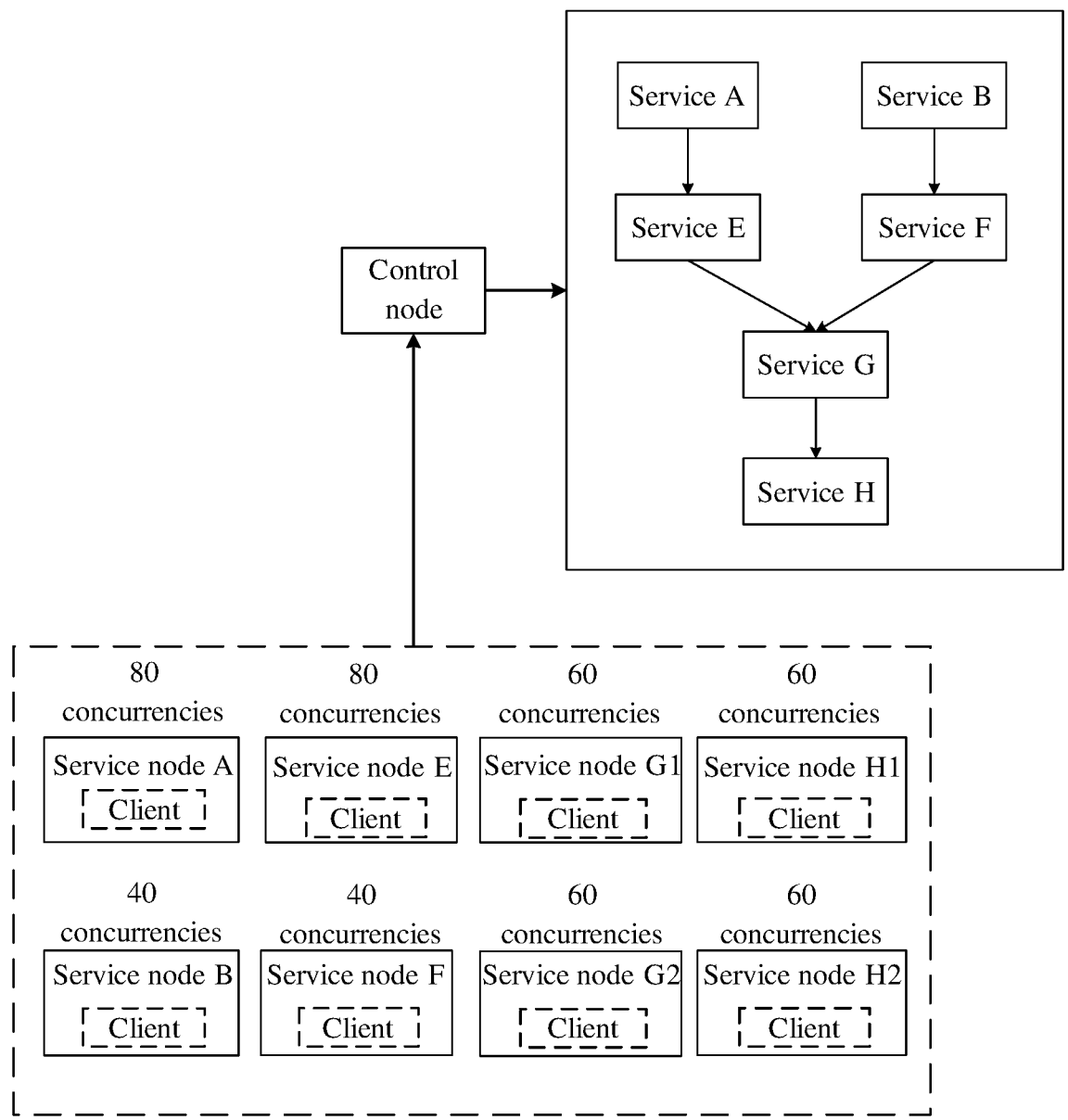
FIG. 5 is a schematic diagram of a service call topology relationship in a call chain-based concurrency control system according to an embodiment of the present application.

In a possible embodiment of the present application, the information processing node collects, in real time, a log recorded by each service node, determines analysis statistical data according to the log, and sends the analysis statistical data to the control node. The control node determines a service call topology relationship in the concurrency control system according to concurrency thresholds and weight data of the service nodes, and the analysis statistical data, as shown in FIG. 5. FIG. 5 is a schematic diagram of a service call topology relationship in a call chain-based concurrency control system according to an embodiment of the present application. A service A is provided by a service node A, a service B is provided by a service node B, a service E is provided by a service node E, and a service F is provided by a service node F. A service G is deployed on a cluster including a service node G1 and a service node G2. A service H is deployed on a cluster including a service node H1 and a service node H2. For initial settings, a concurrency threshold of the service node A is 80, a concurrency threshold of the service node B is 40, a concurrency threshold of the service node E is 80, a concurrency threshold of the service node F is 40; a sum of concurrency thresholds of the cluster with the service G deployed is 120, where concurrency thresholds of both the service node G1 and the service node G2 are 60; and a sum of concurrency thresholds of the cluster with the service H deployed is 120, where concurrency thresholds of both the service node H1 and the service node H2 are 60. In this case, when service nodes are called, the service call topology relationship shown in FIG. 5 satisfies a call requirement of each service node in a call chain.

In a possible embodiment of the present application, if the control node determines, according to analysis statistical data obtained at a moment, that the entire service node G1 is faulty, the service G is provided by only the service node G2, that is, a current concurrency processing capability of the service G changes into 60. In this case, concurrency thresholds of an upper-level service node and a lower-level service node of the service node G1 need to be adjusted based on the service G. The control node may learn, according to the service call topology relationship, that there are two uplink call chains related to the service node G1, which are: the service node E->the service node A, and the service node F->the service node B. A sum of concurrency thresholds of the service node E and the service node F is 120, which exceeds a capability of the service G (the service node G2). Therefore, according to a proportion relationship 2:1 between the concurrency thresholds of the service node E and the service node F, the control node may determine by means of calculation that the concurrency thresholds of the service node E and the service node F should be adjusted to 40 and 20 respectively. The concurrency threshold of the upper-level service node A of the service node E is 80, which is greater than the concurrency threshold 40 of the service node E, and therefore, the concurrency threshold of the service node A also needs to be adjusted. Because the service node E has only one upper-level service node and a weight is 1, the concurrency threshold of the service node A needs to keep consistent with that of the service node E. The same manner may be used to adjust the concurrency threshold of the service node B to 20, to complete adjustment of the concurrency thresholds of the upper-level service nodes. The service G has one downlink call chain including the service H. The service H is deployed on a cluster and a sum of concurrency thresholds of the service H is 120; in this case, the sum of the concurrency thresholds of the service H may be adjusted to 60. In specific implementation, the concurrency thresholds of both the service node H1 and the service node H2 may be adjusted to 30, or one service node that provides the service G may be disabled to save service node resources. In this way, adjustment of the concurrency thresholds of the lower-level service nodes of the service node G is completed.

In another possible embodiment of the present application, if the control node detects that the service node A is a target node with an inappropriate concurrency threshold (for example, a specified concurrency threshold is excessively small), only concurrency thresholds of lower-level service nodes of the service node A need to be adjusted because the service node A does not have an upper-level service node. A specific adjustment manner is the same as that in the foregoing example.

In another possible embodiment of the present application, if the control node detects that the service node H is a target node with an inappropriate concurrency threshold (for example, a network intermittent disconnection occurs), only concurrency thresholds of upper-level service call nodes of the service node H need to be adjusted because the service node H does not have a lower-level service call node. A specific adjustment manner is the same as that in the foregoing example.

It should be noted that, when a concurrency threshold of any service node in any service call topology relationship is set inappropriately, the foregoing adjustment manner may be used to adjust a concurrency threshold of another service node. A general principle is: A newly adjusted concurrency threshold of each service node can satisfy call capabilities of an upper-level service node and a lower-level service node of the target service node. That is, with a new concurrency threshold, concurrency call capabilities of all service nodes match with each other, and there is no surplus concurrency call capability. The foregoing adjustment manner is applicable to scenarios in which a service node is faulty and a concurrency threshold is set inappropriately.

Still further, when concurrency thresholds of multiple service nodes are set inappropriately, the foregoing adjustment manner may be used to sequentially adjust service nodes, to complete a whole adjustment process.

It can be understood that, the foregoing manner may be used to adjust the concurrency threshold of the service node, so that the updated concurrency threshold can satisfy the call relationship, ensuring performance stability of the call chain system.

It should be noted that, the call chain-based concurrency control method described in this embodiment of the present application is applicable to not only the scenarios in which a service node is faulty and a processing delay of the service node exceeds a threshold in the foregoing embodiment, but also to another scenario in which call capabilities of service nodes do not match with each other because of an inappropriate concurrency threshold of a service node. For example, for a service deployed on a cluster, a corresponding adjustment solution described in this embodiment of the present application may be applicable to scenarios in which a sum of concurrency thresholds of the cluster that provides the service is excessively large because of capacity expansion meaning that a service node is increased for deploying the service, and a scenario in which a sum of concurrency thresholds of the cluster that provides the service is excessively small because of capacity reduction meaning that a service node is decreased for deploying the service.

The foregoing details, with reference to FIG. 1 to FIG. 5, the call chain-based concurrency control method provided in the embodiments of the present application. The following details, with reference to FIG. 6 and FIG. 7, a call chain-based concurrency control apparatus and a control node that are provided in embodiments of the present application.

Figure 6:
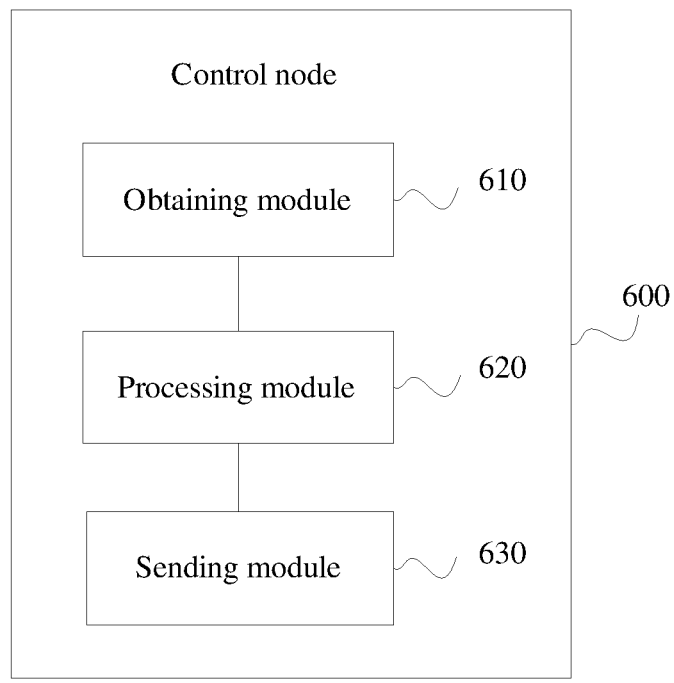
FIG. 6 is a schematic structural diagram of a control node according to an embodiment of the present application.

FIG. 6 is a schematic diagram of a call chain-based concurrency control apparatus 600 according to an embodiment of the present application. The apparatus 600 includes an obtaining module 610, a processing module 620, and a sending module 630.

The obtaining module 610 is configured to obtain analysis statistical data of each of the multiple service nodes.

The processing module 620 is configured to determine, according to the analysis statistical data of each of the multiple service nodes, a target service node whose concurrency threshold is inappropriate in the multiple service nodes.

The obtaining module 610 is further configured to obtain a concurrency threshold of the target service node, and a concurrency threshold and weight information of a neighboring service node of the target service node, where the concurrency threshold is used to indicate a maximum quantity of times that a service node is concurrently called in the concurrency control system, and the weight information is used to indicate a proportion relationship between concurrencies of calling the target service node by the neighboring service node.

The processing module 620 is further configured to determine an updated concurrency threshold of the target service node according to the concurrency threshold of the target service node, the analysis statistical data, and the concurrency threshold and the weight information of the neighboring service node of the target service node.

The sending module 630 is configured to send a concurrency threshold adjustment request to the target service node, where the concurrency threshold adjustment request includes the updated concurrency threshold.

It should be understood that, each module of the apparatus 600 in this embodiment of the present application may be implemented by an application-specific integrated circuit (Application-Specific Integrated Circuit, ASIC) or a programmable logic device (Programmable Logic Device, PLD). The PLD may be a complex programmable logic device (Complex Programmable Logic Device, CPLD), a field-programmable gate array (Field-Programmable Gate Array, FPGA), a generic array logic (Generic Array Logic, GAL), or a combination thereof. Alternatively, when the call chain-based concurrency control method shown in FIG. 4 and FIG. 5 is implemented by software, the apparatus 600 and the modules of the apparatus 600 may also be software modules.

Optionally, the analysis statistical data includes a result of processing a service request by the service node, and the target service node is a service node corresponding to a processing result that service request processing fails.

Optionally, the analysis statistical data includes a delay for processing a service request by the service node, and the target service node is a service node with a service request processing delay greater than or equal to a preset threshold.

Optionally, the analysis statistical data includes a call relationship between the service node and another service node. The obtaining module 610 is further configured to obtain a service call topology relationship in the concurrency control system.

The processing module 620 is further configured to adjust the target service node according to the concurrency threshold of the target service node, the service call topology relationship, and the concurrency threshold and the weight information of the neighboring service node of the target service node, to obtain the updated concurrency threshold.

Optionally, the obtaining the service call topology relationship in the concurrency control system by the obtaining module 610 includes: obtaining the service call topology relationship in the concurrency control system based on the call relationship between each service node and another service node in the analysis statistical data.

Optionally, the processing module 620 is further configured to adjust the neighboring service node of the target service node according to the service call topology relationship, the updated concurrency threshold of the target service node, and the concurrency threshold and the weight information of the neighboring service node, to obtain an updated concurrency threshold of the neighboring service node of the target service node.

The sending module 630 is further configured to send the updated concurrency threshold of the neighboring service node of the target service node to the neighboring service node of the target service node.

According to the foregoing content description, the apparatus 600 obtains the analysis statistical data of each service node; determines the target service node according to the analysis statistical data; obtains the concurrency threshold and the weight information of the upper-level service node or the lower-level service node that is adjacent to the target service node; determines the updated concurrency threshold of the target service node according to the concurrency threshold of the target service node, the analysis statistical data, and the concurrency threshold and the weight information of the upper-level service node or the lower-level service node; and sends, to the target service node, the concurrency threshold adjustment request carrying the updated concurrency threshold. The apparatus 600 dynamically adjusts the concurrency threshold of the service node, so that the updated concurrency threshold can satisfy a concurrency capability call relationship. This resolves a problem that processing performance of the concurrency control system deteriorates because the call chain-based concurrency control system cannot sense a service node fault in time or a concurrency threshold is inappropriate, thereby ensuring stability and reliability of the concurrency control system, reducing a service request processing delay, and improving overall service request processing performance.

The apparatus 600 in this embodiment of the present application may correspondingly execute the method in the embodiment of the present application, and the foregoing and other operations and/or functions of the modules in the apparatus 600 are intended to implement the corresponding procedures performed by the control node in the method shown in FIG. 4. For brevity, no repeated description is given herein again.

It should be noted that the module division in this embodiment of the present application is used as an example, is merely logical function division, and may be other division in actual implementation.

Figure 7:
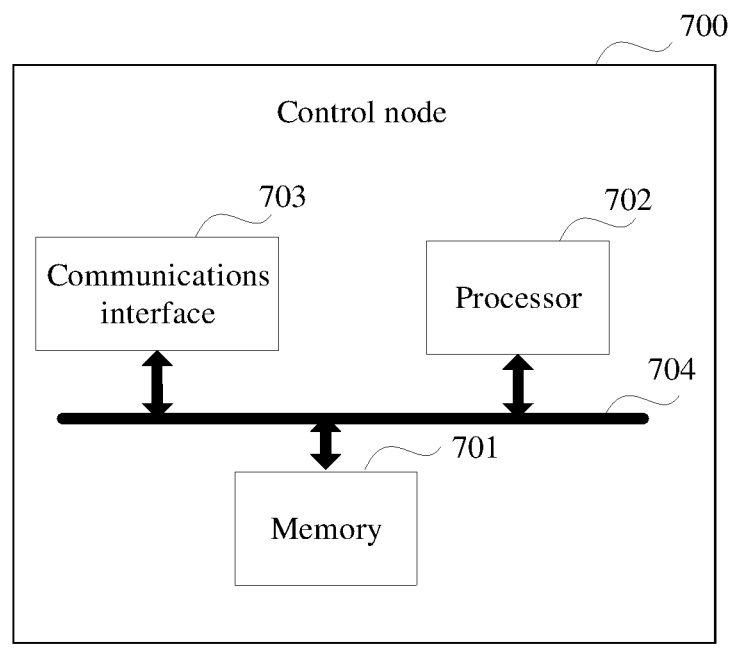
FIG. 7 is a schematic structural diagram of another control node according to an embodiment of the present application.

FIG. 7 is a schematic structural diagram of another control node 700 according to an embodiment of the present application. As shown in FIG. 7, the control node 700 includes a processor 702, a communications interface 703, a memory 701, and a bus 704. The communications interface 703, the processor 702, and the memory 701 may be connected and communicate with each other by using the bus 704. The memory 701 is configured to store a computer executable instruction. When the control node 700 runs, the processor 702 executes the computer executable instruction in the memory 701, to perform the following operations by using a hardware resource of the control node 700: obtaining analysis statistical data of each of the multiple service nodes; determining, according to the analysis statistical data of each of the multiple service nodes, a target service node with an inappropriate concurrency threshold in the multiple service nodes; obtaining a concurrency threshold of the target service node, and a concurrency threshold and weight information of a neighboring service node of the target service node, where the concurrency threshold is used to indicate a maximum quantity of times that a service node is concurrently called in the concurrency control system, and the weight information is used to indicate a proportion relationship between concurrencies of calling the target service node by the neighboring service node; determining an updated concurrency threshold of the target service node according to the concurrency threshold of the target service node, the analysis statistical data, and the concurrency threshold and the weight information of the neighboring service node of the target service node; and sending a concurrency threshold adjustment request to the target service node, where the concurrency threshold adjustment request includes the updated concurrency threshold.

It should be understood that in this embodiment of the present application, the processor 702 may be a CPU, or the processor 702 may be another general purpose processor, a digital signal processor (DSP), an application-specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor or the like.

The memory 701 may include a read-only memory and a random access memory, and provide an instruction and data for the processor 702. A part of the memory 701 may further include a non-volatile random access memory. For example, the memory 701 may further store device type information.

The bus 704 may further include a power bus, a control bus, a status signal bus, and the like, in addition to a data bus. However, for clear description, various types of buses in the figure are marked as the bus 704.

It should be noted that, the control node 700 in this embodiment of the present application may be corresponding to the control node 120 in the concurrency control system shown in FIG. 1 in the embodiment of the present application and the apparatus 600 shown in FIG. 6, and may be corresponding to the control node in FIG. 4 according to the embodiment of the present application. The foregoing and other operations and/or functions of the modules in the control node 700 are intended to implement the corresponding procedures of the methods shown in FIG. 4 and FIG. 5. For brevity, no repeated description is given herein again.

All or some of the foregoing embodiments may be implemented by means of software, hardware, firmware, or any combination thereof. When software is used to implement the embodiments, the embodiments may be implemented entirely or partially in a form of a computer program product. The computer program product includes one or more computer instructions. When the computer program instructions are loaded or executed on a computer, the procedure or functions according to the embodiments of the present application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk, SSD), or the like.

It should be noted that, to make the description brief, the foregoing method embodiments are expressed as a series of actions. However, persons skilled in the art should appreciate that the present application is not limited to the described action sequence, because according to the present application, some steps may be performed in other sequences or performed simultaneously. In addition, persons skilled in the art should also appreciate that all the embodiments described in the specification are the related actions and modules are not necessarily mandatory to the present application.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected to achieve the objectives of the solutions of the embodiments.

The foregoing embodiments are merely intended to describe the technical solutions in the present application, but not to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present application.

What is claimed is:

1. A method implemented by a control node, the method comprising:
   identifying, based on an analysis of statistical data of a plurality of service nodes communicatively coupled to the control node, a target service node needing adjustment of a concurrency threshold, wherein the target service node has a neighboring service node, and wherein the concurrency threshold indicates a maximum value of service requests that can be processed in parallel by the target service node;
   obtaining the concurrency threshold and a weight of the target service node, wherein the weight indicates a number of times that the target service node can process service requests from the neighboring service node;
   determining an updated concurrency threshold of the target service node according to the concurrency threshold, the analysis, a neighboring concurrency threshold of the neighboring service node, and a neighboring weight of the neighboring service node; and
   sending an adjustment request to the target service node to instruct the target service node to adjust the concurrency threshold to the updated concurrency threshold.

2. The method of claim 1, wherein the statistical data indicate processing results of processing service requests, and wherein a processing result corresponding to the target service node is a failure to process a service request.

3. The method of claim 1, wherein the statistical data indicate delays for processing service requests, and wherein a delay corresponding to the target service node is greater than or equal to a preset threshold.

4. The method of claim 1, wherein when the statistical data comprise a call relationship between a first service node and a second service node, the method further comprises:
   obtaining a service call topology relationship in a concurrency control system; and
   adjusting the target service node according to the concurrency threshold, the service call topology relationship, the neighboring concurrency threshold, and the neighboring weight to obtain the updated concurrency threshold.

5. The method of claim 4, further comprising obtaining the service call topology relationship according to the call relationship.

6. The method of claim 5, further comprising:
   adjusting the neighboring service node according to the service call topology relationship, the updated concurrency threshold, the neighboring concurrency threshold, and the neighboring weight to obtain an updated neighboring concurrency threshold of the neighboring service node; and
   sending the updated neighboring concurrency threshold to the neighboring service node.

7. The method of claim 1, further comprising further identifying the target service node based on a service request failing on the target service node.

8. The method of claim 1, further comprising further identifying the target service node based on a delay for processing a service request by the target service node exceeding a preset threshold.

9. A control node comprising:
   a memory; and
   a processor coupled to the memory and configured to:
      identify, based on an analysis of statistical data of a plurality of service nodes communicatively coupled to the control node, a target service node needing adjustment of a concurrency threshold, wherein the target service node has a neighboring service node, and wherein the concurrency threshold indicates a maximum value of service requests that can be processed in parallel by the target service node;
      obtain the concurrency threshold and a weight of the target service node, wherein the weight indicates a number of times that the target service node can process service requests from the neighboring service node;

determine an updated concurrency threshold of the target service node according to the concurrency threshold, the analysis, a neighboring concurrency threshold, and a neighboring weight of the neighboring service node; and send an adjustment request to the target service node to instruct the target service node to adjust the concurrency threshold to the updated concurrency threshold.

10. The control node according to claim 9, wherein the statistical data indicate processing results of processing service requests, and wherein a processing result corresponding to the target service node is a failure to process a service request.

11. The control node of claim 9, wherein the statistical data indicate delays for processing service requests, and wherein a delay corresponding to the target service node is greater than or equal to a preset threshold.

12. The control node of claim 9, wherein when the statistical data comprise a call relationship between a first service node and a second service node, the processor is further configured to:

obtain a service call topology relationship in a concurrency control system; and adjust the target service node according to the concurrency threshold, the service call topology relationship, the neighboring concurrency threshold, and the neighboring weight to obtain the updated concurrency threshold.

13. The control node of claim 12, wherein the processor is further configured to obtain the service call topology relationship according to the call relationship.

14. The control node of claim 13, wherein the processor is further configured to:

adjust the neighboring service node according to the service call topology relationship, the updated concurrency threshold, the neighboring concurrency threshold, and the neighboring weight to obtain an updated neighboring concurrency threshold of the neighboring service node; and send the updated neighboring concurrency threshold to the neighboring service node.

15. The control node of claim 9, wherein the processor is further configured to further identify the target service node based on a service request failing.

16. The control node of claim 9, wherein the processor is further configured to further identify the target service node based on a delay for processing a service request by the target service node exceeding a preset threshold.

17. A computer program product comprising computer-executable instructions stored on a non-transitory computer-readable medium that, when executed by a processor, cause a control node to:

identify, based on an analysis of statistical data of a plurality of service nodes communicatively coupled to the control node, a target service node needing adjustment of a concurrency threshold, wherein the target service node has a neighboring service node, and wherein the concurrency threshold indicates a maximum value of service requests that can be processed in parallel by the target service node;

obtain the concurrency threshold and a weight of the target service node, wherein the weight indicates a number of times that the target service node can process service requests from the neighboring service node;

determine an updated concurrency threshold of the target service node according to the concurrency threshold, the analysis, a neighboring concurrency threshold, and a neighboring weight of the neighboring service node; and send an adjustment request to the target service node to instruct the target service node to adjust the concurrency threshold to the updated concurrency threshold.

18. The computer program product of claim 17, wherein the statistical data indicate processing results of processing service requests, and wherein a processing result corresponding to the target service node is a failure to process a service request.

19. The computer program product of claim 17, wherein the statistical data indicate delays for processing service requests, and wherein a delay corresponding to the target service node is greater than or equal to a preset threshold.

20. The computer program product of claim 17, wherein when the statistical data comprise a call relationship between a first service node and a second service node, the instructions further cause the control node to:

obtain a service call topology relationship in a concurrency control system; and adjust the target service node according to the concurrency threshold, the service call topology relationship, the neighboring concurrency threshold, and the neighboring weight to obtain the updated concurrency threshold.

* * * * *